United States Patent [19]

Yoshida et al.

[11] Patent Number: 5,258,107

[45] Date of Patent: Nov. 2, 1993

[54] METHOD FOR MANUFACTURING A CANTILEVER WITH SHARPENED METAL NEEDLE

[75] Inventors: Hitoshi Yoshida; Toshihiko Sakuhara; Katsunori Honma, all of Tokyo, Japan

[73] Assignee: Seiko Instruments Inc., Japan

[21] Appl. No.: 886,329

[22] Filed: May 20, 1992

[30] Foreign Application Priority Data

May 28, 1991 [JP] Japan ................................. 3-123962

[51] Int. Cl.⁵ .............................. C25F 3/12; C25F 3/14
[52] U.S. Cl. ........................... 204/129.55; 204/192.15;
 204/192.23; 204/192.17; 156/653
[58] Field of Search ..................... 204/129.55, 192.17,
 204/192.22, 192.23, 192.15; 156/653; 205/122,
 221, 223

[56] References Cited

U.S. PATENT DOCUMENTS

| | | | |
|---|---|---|---|
| 4,916,002 | 4/1990 | Carver | 156/653 X |
| 5,035,780 | 7/1991 | Suzuki et al. | 204/129.55 |
| 5,085,746 | 2/1992 | Musselman et al. | 204/129.55 X |
| 5,145,564 | 9/1992 | Lemke et al. | 204/129.55 |

*Primary Examiner*—Donald R. Valentine
*Attorney, Agent, or Firm*—Bruce L. Adams; Van C. Wilks

[57] ABSTRACT

In a method of making a cantilever for atomic force micoscopes, to provide a method of manufacturing a high-resolution cantilever having a sharpened metal needle by introducing an electrolytic polishing process. In the method of making a cantilever, an erect metal structure, an electrode layer and an electric insulation layer are formed, and they are subjected to the electrolytic polishing process to allow a large number of erect metal structures formed on a silicon wafer to be formed into sharpened metal needles at a time. The cantilever having a sharpened metal needle manufactured by the method of this invention makes it possible to measure with high resolution specimen surface with deep grooves and holes and high projections that cannot be measured by the conventional cantilever having a pyramidal needle.

19 Claims, 9 Drawing Sheets

FIG.7 PRIOR ART
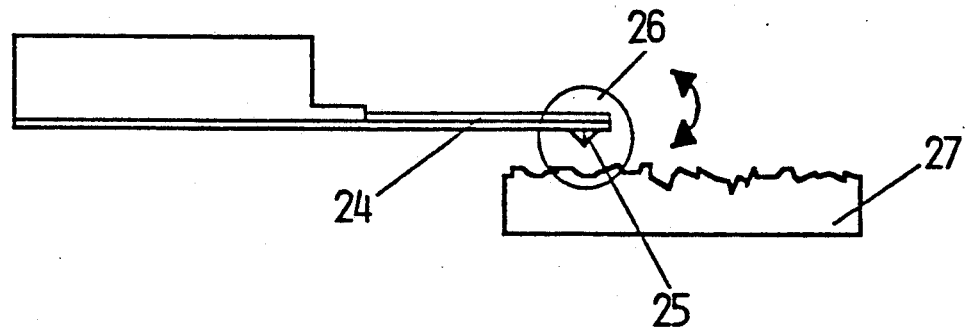
FIG.8A PRIOR ART
FIG.8C PRIOR ART
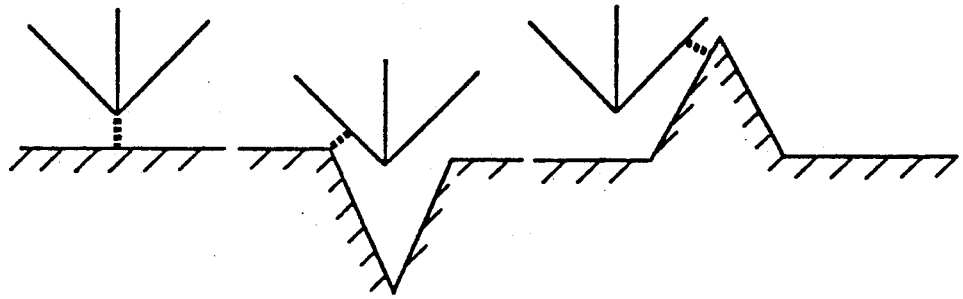
FIG.8B PRIOR ART
FIG.9A PRIOR ART
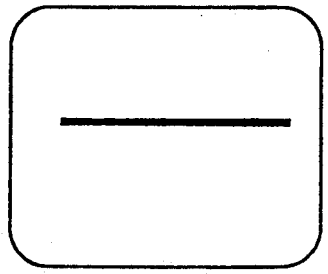
FIG.9B PRIOR ART
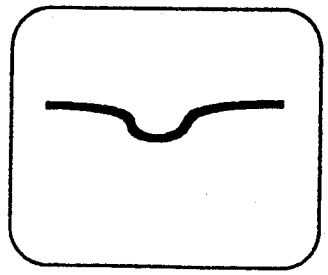
FIG.9C PRIOR ART
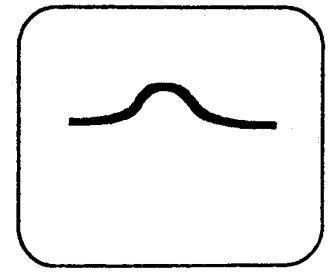

METHOD FOR MANUFACTURING A CANTILEVER WITH SHARPENED METAL NEEDLE

BACKGROUND OF THE INVENTION

The present invention relates to a method of manufacturing a cantilever that measures the atomic force acting between atoms on the surface of a specimen in an atomic force microscope.

U.S. Pat. Nos. 4912822 and 4916002 disclose the conventional structure of a cantilever and the method manufacturing a cantilever 100 $\mu$m long and 10 $\mu$m wide having a pyramidal needle (6 $\mu$m long along the side of the bottom and 7 $\mu$m high) made of silicon nitride or tungsten, as shown in FIG. 7, and a cantilever without a needle. That is, the silicon substrate is formed with a pyramidal hole and then coated with a thin film that constitutes a cantilever. By using photolithography, the cantilever is formed into a desired shape, which is put in contact with a glass as a mount.

However, the conventional cantilevers usually do not have a needle or, if they have a needle, the needle at the end of the cantilever is formed in a pyramidal shape with its vertex angle obtuse at 72 degrees. When a measuring portion 26 is to be used to measure deep holes, grooves or high projections on the surface of a specimen 27, as shown in FIG. 7, parts other than the front end of the needle are subjected to atomic force of atoms. In other words, as shown in FIGS. 8B and 8C, the apex of the needle cannot follow the contour of the specimen surface, with the result that the output waveforms cannot reproduce the shape of the specimen surface, as shown in FIGS. 9B and 9C, degrading the resolution.

SUMMARY OF THE INVENTION

It is an object of the present invention to provide a cantilever that has a needle with a pointed shape and an acute vertex angle.

To achieve the above object, the method of making the cantilever according to the present invention includes the following steps: forming an electrode layer and an electric insulation layer over the metal needles mounted on a spring element of each of many cantilevers, which are formed on a silicon wafer; and subjecting these cantilevers to an electrolytic polishing process to form the needles into sharpened shape with an acute vertex angle.

In the cantilever with the above construction, since the metal needle has a sufficiently acute vertex angle, which is formed by the electrolytic polishing process, the pointed end of the metal needle can trace such specimen surfaces as may not be able to be traced by the conventional pyramidal needle. Because of the atomic force acting between the atoms of the specimen surface and the atoms of the pointed end of the metal needle, the cantilever as a whole is displaced so that the atomic profile of the specimen surface can be obtained according to the amount of displacement. That is, in the atomic force microscope using the cantilever of this invention, the output waveforms precisely reproduce the shape of the specimen surface, permitting a high-resolution measurement.

BRIEF DESCRIPTION OF THE DRAWINGS

FIG. 7 is an explanatory view showing the problem of resolution experienced with a conventional cantilever having a needle with an obtuse angle;

FIGS. 8A-8C are enlarged views showing the portion being measured by the conventional cantilever; and FIGS. 9A-9C are explanatory views showing the output waveforms of the conventional cantilever.

DETAILED DESCRIPTION OF THE PREFERRED EMBODIMENTS

Now, embodiments of the present invention will be described by referring to the accompanying drawings.

Figure 1A:
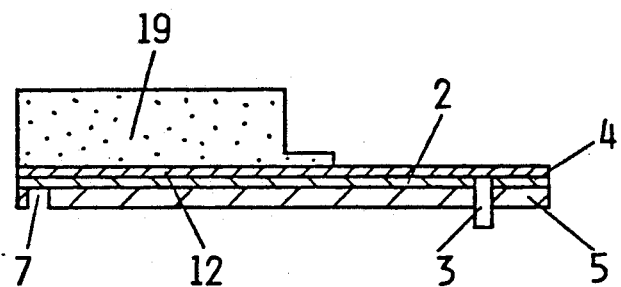
FIGS. 1A-1D are explanatory views showing the electrolytic polishing process of the present invention.
Figure 1B:
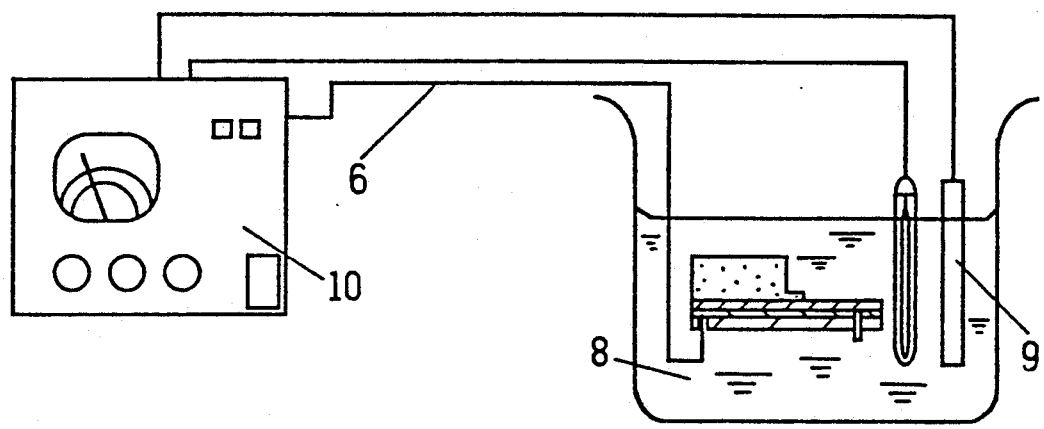
Figure 1C:
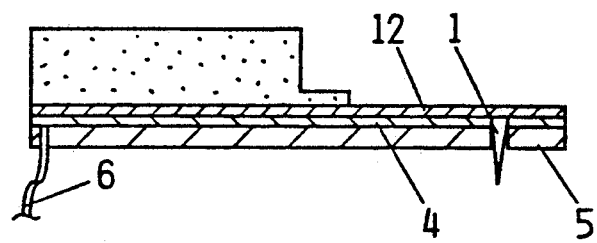
Figure 1D:
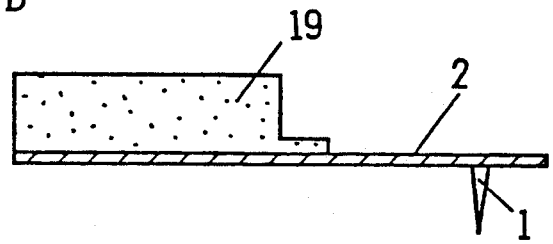

FIGS. 1A-1D the outline the procedure for sharpening the metal needle 1 by means of the electrolytic polishing process. First, an shown in FIG. 1A, a spring element 2 is provided with an erect metal structure 3 at an arbitrary position, which is to be subjected to the electrolytic polishing process. An electric insulation layer 5 is formed over the whole or a part of the surface of the cantilever and prevents corrosion of electrode layer 4, the electrode layer being electrically conductive to the erect metal structure. A contact hole 7 is used to connect the electrode layer 4 to an external lead wire 6 (FIG. 1B). The electrode layer 4 may be formed of any metal (e.g., copper or aluminum) that is weaker against acid or alkali than the metal that performs electrolytic polishing of the erect metal structure and which therefore can be removed. The electric insulation layer 5 protects the electrode layer 4 and therefore should preferably have a high insulation capability and a fine membrane structure. It is desired that the electric insulation layer 5 be formed of such a material (e.g., silicon oxide film or silicon nitride film) as this material can be removed by a process after, the electrolytic polishing. Next, as shown in FIG. 1B, a part of the electrode layer 4 is connected through the contact hole 7 fitted in the electric insulation layer 5 to the lead wire 6, which in turn is connected, via an electric potential controller 10, to an electrode system 9 immersed in the electrolytic, polishing liquid 8 (the liquid composition may vary depending on the metal to be electrolytically polished; in the case of tungsten the liquid may be a 10%-NaOH solution). The cantilever as a whole is immersed in the electrolytic polishing liquid 8, and is applied with a potential of an amplitude necessary for the electrolytic polishing to pass a specified current for a specified period of time to perform the electrolytic polishing (the condition of electrolytic polishing varies depending on the size and material of the metal needle 1 (FIG. 1C); in the case of tungsten the conditions are 6 V, 3-6 A/dm$^2$, 15 minutes). At this time, the electrode layer 4 is protected by the electric insulation layer 5 from the electrolytic polishing. Then, as shown in FIGS. 1C and 1D, the electrode layer 4 and the electric insulation layer 5 are removed after the electrolytic polishing.

While in FIGS. 1A-1D the electrolytic polishing process is shown to be preformed after the cantilever is formed, it is possible to perform it during the process of making the cantilever.

FIGS. 2A-2M show in detail one example process of making the cantilever which has a metal needle 1 sharpened by the electrolytic polishing process of the present invention.

Figure 2A:
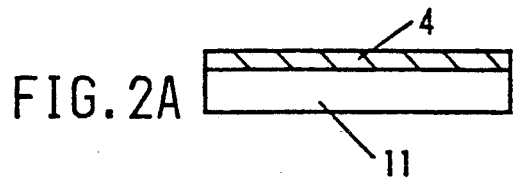
FIGS. 2A-2M are process follow diagrams showing the method of making the cantilever according to the present invention.

(A) An electrode layer 4 is formed over the upper surface of the silicon single crystal substrate (1, 0, 0). The electrode layer 4 may be formed of copper, aluminum or tungsten to the thickness of about 0.2 μm by means of vapor deposition or sputtering. The electrode layer 4 may use other materials as long as they have a high conductivity and can be removed in a later process (FIG. 2A).

Figure 2B:
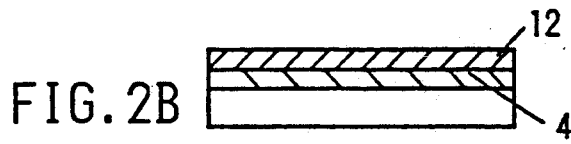

(B) A thin-film layer 12 is formed over the upper surface of the electrode layer 4. This thin-film layer 12 will undergo a later process to form a spring element 2 for detecting the atomic force. The layer uses a film that is fine and dense in structure and electrically insulating. (For example, the silicon oxide film <thickness: 0.8-1.6 μm> or silicon nitride film <thickness: 0.2-0.6 μm>) (FIG. 2B).

Figure 2C:
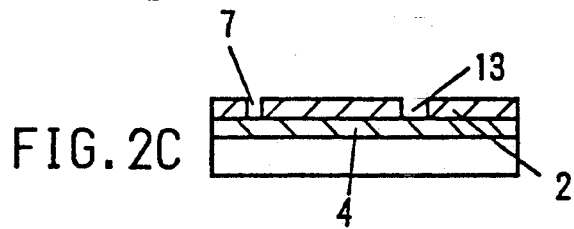

(C) The thin-film layer 12 is formed by photolithography into the shape of the spring element 2 and also formed with a fine hole 13 1-20 μm across for electrical connection with the electrode layer 4 and with the contact hole 7. The spring element 2 is so shaped as to have physical characteristics with the spring constant of 0.0001-2.00 N/m and the resonance frequency of 0.1-300 kHz. The spring element 2 is 10-500 μm long and 1-50 μm wide (FIG. 2C).

Figure 2D:
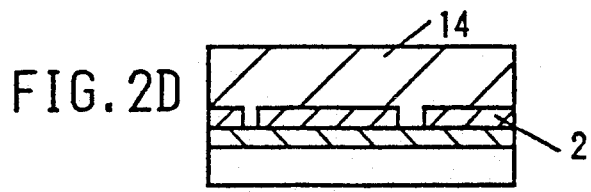

(D) A 1-60 μm thick spacer layer 14 is formed over the upper surface of the spring element 2. Since the spacer layer 14 should be removed completely later, it is made of such metals as copper that is easily corroded by acid and alkali (FIG. 2D).

Figure 2E:
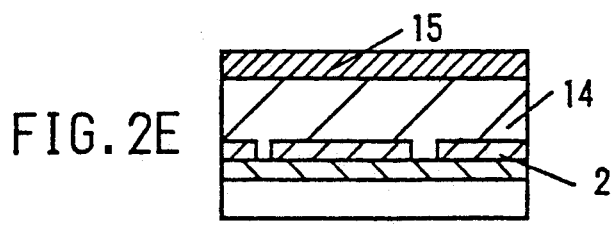

(E) A masking layer 15 is formed over the upper surface of the spacer layer 14. The masking layer 15 may be formed of a thin metal film, silicon oxide film or silicon nitride film, less than 1 μm thick, that is more resistant to acid and alkali than the spacer layer 14 (FIG. 2E).

Figure 2F:
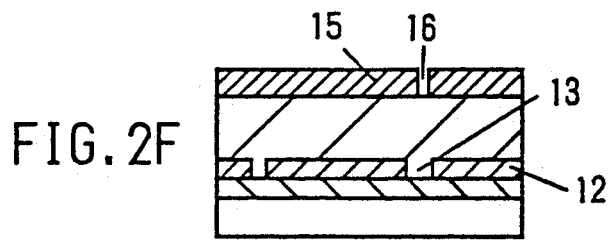

(F) The masking layer 15 is formed with a fine masking hole 16, which is located above the fine hole 13 in the thin-film layer 12. The masking hole 16 has a diameter 1/5 to ½ that of the fine hole 13 (FIG. 2F).

Figure 2G:
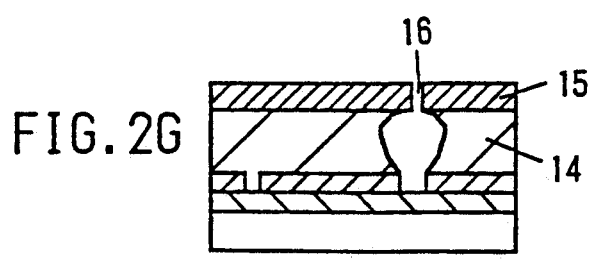

(G) The etching liquid that forms the masking hole 16 also etches into the spacer layer 14 located below the masking layer 15. The etching condition and the selection ratio vary greatly depending on the temperature and the selected materials of the masking layer 15 and the spacer layer 14 (FIG. 2G).

Figure 2H:
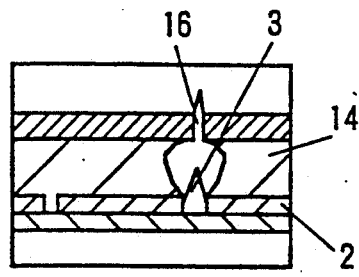

(H) The erect metal structure 3 is formed by sputtering from the upper surface of the masking hole 16. The erect metal structure 3 is not formed except in a location in the spring element 2 defined by the spacer layer 14. The erect metal structure 3 formed is 0.1-500 μm² in the bottom area and 0.5-50 μm high. The material may be tungsten, titanium-tungsten alloy, aluminum and stainless steel or any other metals that allow electrolytic polishing (FIG. 2H).

Figure 2I:
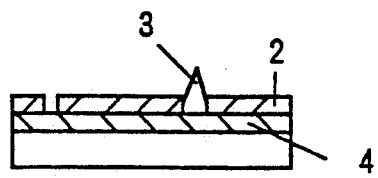

(I) The spacer layer 14 and the masking layer 15, both not needed any more, are removed. They can easily be removed by immersing the layers in a weak acid or alkali that the erect metal structure 3 can withstand. Then the electrode layer 4 is left with only the portion covered by the spring element 2, and unwanted portions not covered by the spring element 2 are removed along with the spacer layer 14 (FIG. 2I).

Figure 2J:
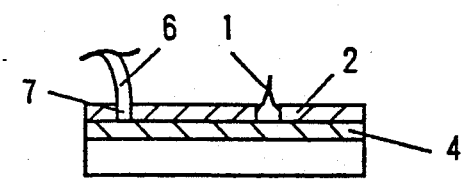

(J) The external lead wire 6 is connected, through the contact hole 7, to the electrode layer 4. The cantilever as a whole is immersed in the electrolytic polishing liquid 8 (FIG. 1B) to perform the electrolytic polishing process and thereby form the erect metal structure 3 into a sharp metal needle 1. A large number of erect metal structures 3 on the spring elements 2 formed on the silicon wafer can be polished simultaneously. That is, once a proper setting is made of the electrolytic polishing conditions according to the kind and size of the erect metal structure 3, the succeeding electrolytic polishing can be performed under the same conditions, thus enabling a large number of metal needles 1 of the cantilevers to be sharpened in a short period of time (FIG. 2J).

Figure 2K:
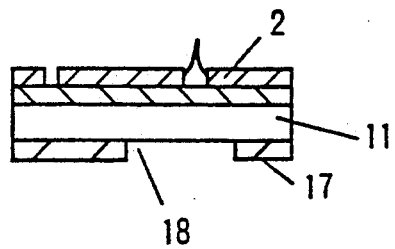

(K) A 0.1-3 μm thick masking 17 is formed under the silicon substrate 11 to etch the substrate. A masking hole 18 formed in the masking layer 17 is located immediately below the square hole that was formed when the spring element 2 was fabricated. The masking layer 17 may be of any material (for example, an oxide film or nitride film) that is resistant to the etching liquid used to each the silicon substrate 11 (FIG. 2K).

Figure 2L:
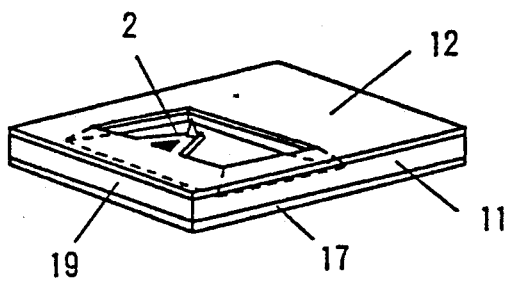

(L) A part of the silicon substrate 11 is removed. The part of the silicon substrate 11 covered by the masking layer 17 is not etched away but is used as a mount 19 for the thin-film layer 12 and the spring element 2. This etching process employs an anisotropic etching. The etching liquid (e.g., potassium hydroxide solution, hydrazine, and ethylenediamine-pyrocatechol-wafer mixture) used preferably has a high selection ratio between the masking layer 17 and the silicon substrate 11. The mount 19 for the cantilever is necessary for mounting the thin-film layer 12, which forms the spring element 2, onto the atomic force microscope. The mount 19 is 2 mm×5 mm in size and 0.5-1 mm thick and may use any material (e.g., silicon single-crystal, glass, and photo curable resin) that is mechanically strong and capable of adhering to the material of the thin-film layer 12 (FIG. 2L).

Figure 2M:
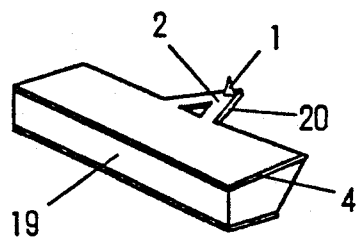

(M) A large number of cantilevers formed on the silicon wafer are cut off by a dicing saw. The electrode layer 4 remaining under the spring element 2 functions as a reflection layer 20 that detects the displacement of the spring element 2 by using light (FIG. 2M).

FIGS. 3A-3M show in detail other example process of making a cantilever that has a metal needle 1 sharpened by an electrolytic polishing process according to the present invention.

Figure 3A:
FIGS. 3A-3M are process follow diagrams showing the method of making the cantilever according to the present invention.
Figure 3B:
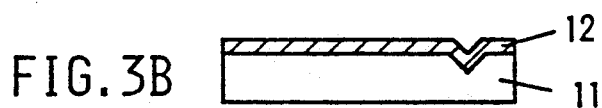

(A) The silicon substrate 11 is formed with a metal needle forming hole 21 of 1-20 μm diameter and 1-50 μm depth. The metal needle forming hole 21 may have a shape such as cylinder, cone, polygonal pillar, or polygonal pyramid. The cone or polygonal pyramid will take less time for the electrolytic polishing process. The metal needle forming hole 21 can easily be formed by anisotropic etching or electrical discharge machining (FIG. 3A).

(B) A thin-film layer 12 is formed over the silicon substrate 11. The thin-film layer 12 will undergo a later process to form the spring element 2 for detecting the atomic force. This layer 12 should use a film that has a fine and dense structure and is electrically insulating (for example, silicon oxide film < thickness: 0.8–1.6 $\mu$m > or silicon nitride film < thickness: 0.2–0.6 $\mu$m >). (FIG. B).

Figure 3C:
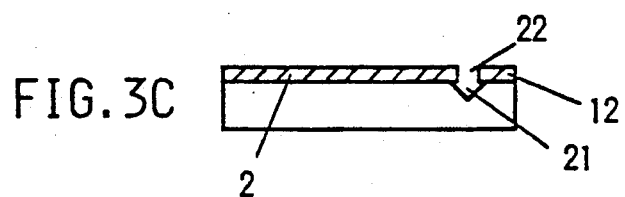

(C) The thin-film layer 12 is formed by photolithography into the shape of the spring element 2 and also formed with a fine hole 22 1–20 $\mu$m across, smaller than the metal needle forming hole 21, which is located above the metal needle forming hole 21. The spring element thus formed has a spring constant of 0.0001–2.00 N/m and a resonance frequency of 0.1–300 kHz and has a size 10–500 $\mu$m long and 1–50 $\mu$m wide (FIG. 3C).

Figure 3D:
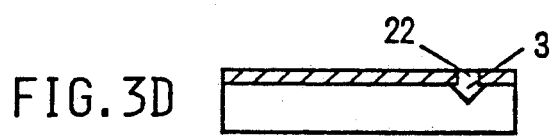

(D) An erect metal structure 3 is formed in the fine hole 22 by sputtering. The erect metal structure 3 thus formed is equal in size to the metal needle forming hole 21. The material of the metal structure 3 may, for example, be a tungsten, a titanium-tungsten alloy, an aluminum or a stainless steel, or any other material that can be electrolytic-polished (FIG. 3D).

Figure 3E:
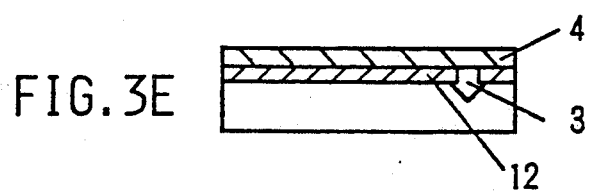

(E) An electrode layer 4 it formed over the upper surface of the thin-film layer 12 to cover the erect metal structure 3. The electrode layer 4 is formed of copper, aluminum or tungsten to a thickness of about 0.2 $\mu$m by vapor deposition or sputtering. The material for the electrode layer 4 is such that it has high conductivity and can be removed in a later process (FIG. 3E).

Figure 3F:
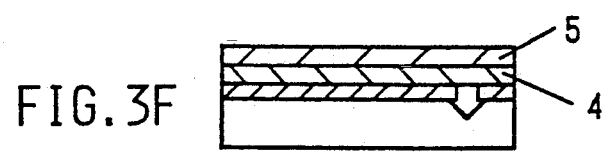

(F) An electrically insulating layer 5 less than 1 $\mu$m thick is formed over the upper surface of the electrode layer 4 to protect the electrode layer 4. The material of the electric insulating layer 5 is such that it has high electric insulating capability and has a fine and dense structure. Such materials may include silicon oxide film and silicon nitride film (FIG. 3F).

Figure 3G:
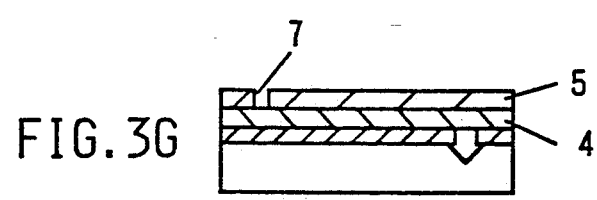

(G) A contact hole 7 is formed in the electric insulating layer 5 to connect the external lead wire 6 to the electrode layer 4. The contact hole 7 has a size that allows the covered external lead wire 6 (FIG. 3I) to be connected by soldering (FIG. 3G).

Figure 3H:
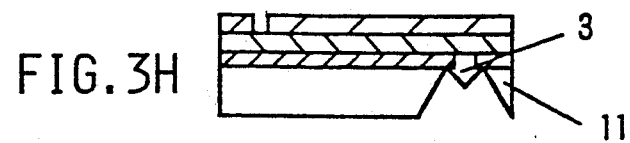

(H) The erect metal structure 3 embedded in the metal needle forming hole 21 in the silicon substrate 11 is exposed so that it can be subjected to the electrolytic polishing. This is done by anisotropically etching the silicon (FIG. 3H).

Figure 3I:
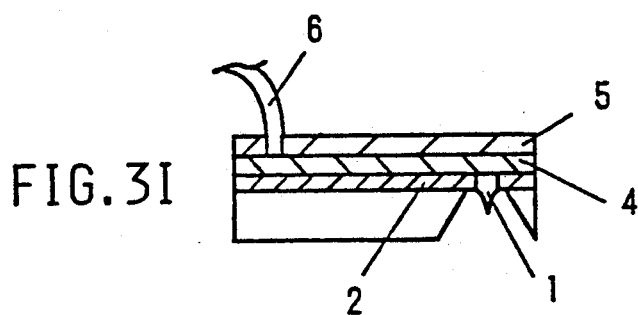

(I) The external lead wire 6 is connected, through the contact hole 7, to the electrode layer 4. The cantilever as a whole is immersed in the electrolytic polishing liquid 8 (FIG. 1B) and subjected to the electrolytic polishing to sharpen the erect metal structure 3 into a pointed metal needle 1. Then, a large number of erect metal structures 3 on spring elements 2 formed on the silicon wafer can be polished at one time. That is, once a proper setting is made of the electrolytic polishing conditions according to the kind and size of the erect metal structure 3, the succeeding electrolytic polishing can be performed under the same conditions, thus enabling a large number of metal needles 1 of the cantilevers to be sharpened in a short period of time (FIG. 3I).

(J) After the electrolytic polishing is finished, the electrode layer 4 and the electric insulating layer 5 are not necessary and thus are removed.

Figure 3J:
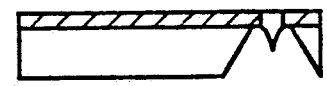

When, for example, the electric insulating layer 5 is a silicon oxide film, it is etched away by a 1/10-diluted hydrofluoric acid solution. When it is a nitride film, it is dry-etched and removed (FIG. 3J).

Figure 3K:
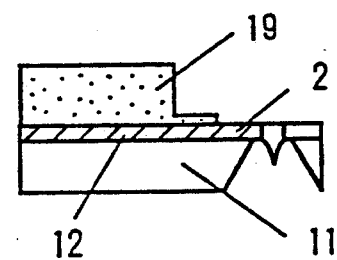

(K) A mount 19 to support the thin-film layer 12 and the spring element 2 is formed over the upper surface of the thin-film layer 12 which is exposed by the removal of the electrode layer 4. The mount 19 is necessary for mounting the thin-film layer 12, which forms the spring element 2, onto the atomic force microscope. The mount 19 is 2 mm × 5 mm in size and 0.5–1 mm thick and may use any material (such as single-crystal silicon, glass, and photo curable resin) that is mechanically strong and capable of adhering to the material of the thin-film layer 12 (FIG. 3K).

Figure 3L:
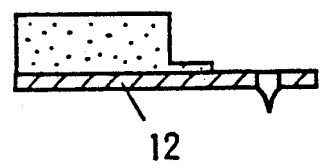

(L) The silicon substrate 11 under the thin-film layer 12 is completely removed (FIG. 3L).

Figure 3M:
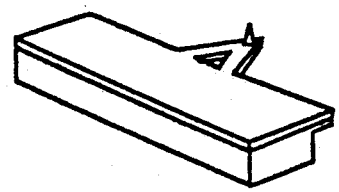

(M) A large number of cantilevers formed on the silicon wafer are cut off by a dicing saw (FIG. 3M).

Figure 4A:
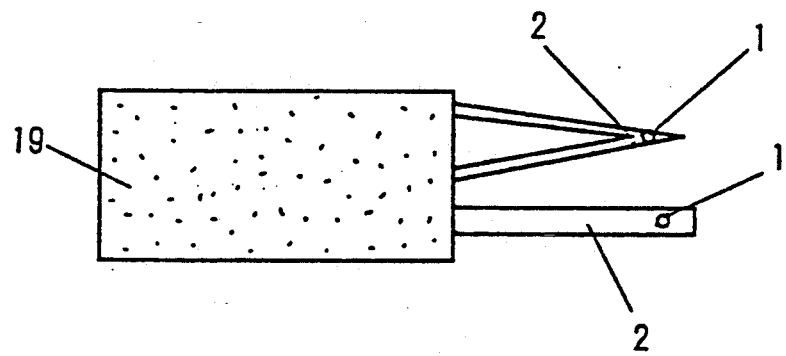
FIGS. 4A and 4B are a plan view and a cross section of the cantilever having a protective film, manufactured according to the method of the present invention, respectively.
Figure 4B:
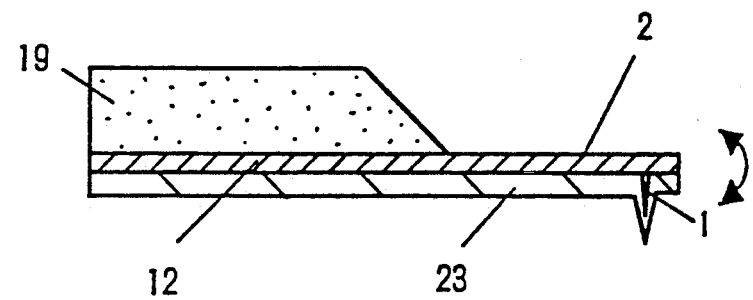

FIGS. 4A and 4B are a plan view and a cross section, respectively, of an example structure of the cantilever that has a metal needle 1 sharpened by the electrolytic polishing process of the present invention and also a protective film 23 for the metal needle 1.

Prior to cutting off the cantilevers of the second and third embodiment by a dicing saw, a fine and dense protective film 23 is formed on the side where the metal needle 1 is exposed. The protective film 23 prevents degradation of the metal needle 1 in the measurement of the specimen surface It is a 5–1000 nm film of any insulating material capable of adhering to the thin-film layer 12 and the metal needle 1.

Figure 5A:
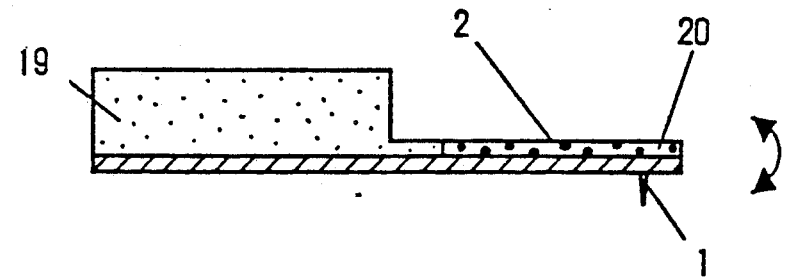
FIGS. 5A and 5B are cross sections of the cantilevers having a reflection film, manufactured according to the method of the present invention.
Figure 5B:
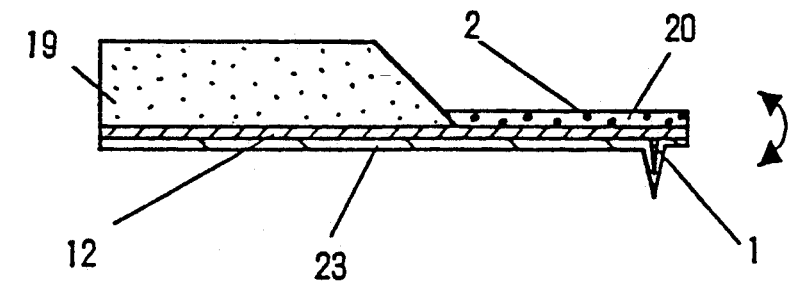
Figure 6A:
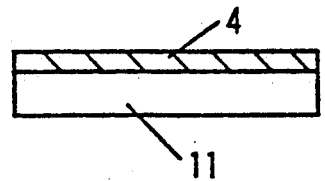
FIGS. 6A-6H are process flow diagrams showing the method of making the cantilever using the photo-induced CVD process according to the present invention.
Figure 6B:
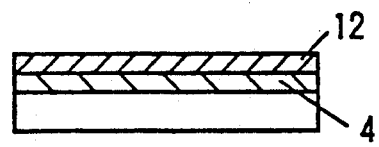
Figure 6C:
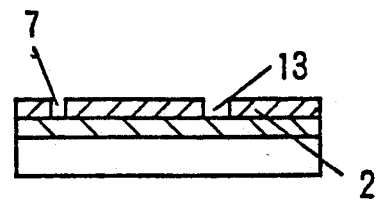
Figure 6D:
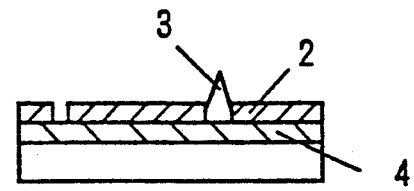
Figure 6E:
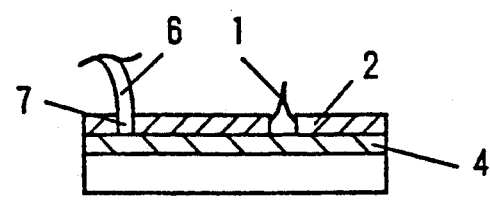
Figure 6F:
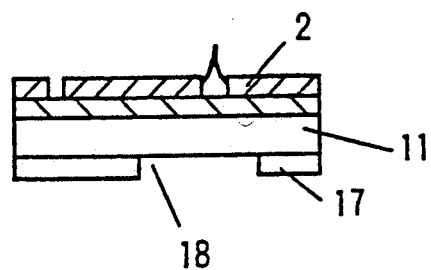
Figure 6G:
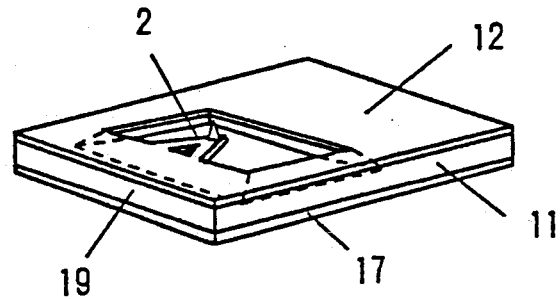
Figure 6H:
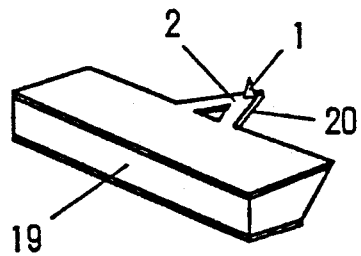

FIGS. 5A and 5B are cross sections showing the construction of the cantilever having a light reflection film 20 formed on the upper surface of the spring element 2. The cantilever in FIG. 5B also has a protective film 23 in addition to the reflection film 20.

Before cutting off the cantilevers by dicing in the cantilever manufacturing process of the second and third embodiments, a metal film is formed over the spring element 2 by vapor deposition and sputtering to provide a reflection film 20. The reflection film 20 is necessary only for detecting the displacement of the spring element 2 by light and thus need only be a thin and uniform film less than 1 $\mu$m thick.

FIGS. 6A–6H show in detail an example process of making the cantilever that uses the photo-induced chemical vapor deposition (CVD) process of this invention.

The photo-induced CVD process assists the light energy by radiating light during the CVD process. It has a high special selectivity in forming films during the low-temperature process. The photo-induced CVD process therefore has a variety of applications for making the cantilevers.

For example, in the process of making the cantilevers of the second and third embodiments, replacing the process of forming the erect metal structure 3—the process (H) in the second embodiment and the process (D) in the third embodiment—with the photo-induced CVD process renders unnecessary the process of forming the space layer 14 and the metal needle forming hole 21. That is, the process (A) to (C) is the same as the process (A) to (C) of the second embodiment. In the process (D), the erect metal structure 3 are selectivity formed by the photo-induced CVD process. Then, the process (E) to (H) is similar to the process (J) to (M) of the second embodiment. Because of its high spatial selectivity, the photo-induced CVD process of this embodiment can use a tungsten hexafluoride as the material gas and form a needle structure of tungsten, reducing the time taken by the electrolytic polishing.

Further, during forming the masking layer, it is possible to eliminate the photolithography process and directly form a masking layer of a necessary shape. That is, the introduction of the photo-induced CVD process substantially reduces the time required by the process of making the cantilever with a sharp metal needle 1.

Since this invention provides the electrode layer 4 and the electric insulation layer 5 and forms a large number of sharp metal needles 1 at desired positions on the spring element 2 at one time by means of the electrolytic polishing process, a high-resolution measurement of a specimen surface is assured regardless of the condition of the specimen surface being measured.

What is claimed is:

1. A method of manufacturing a cantilever using a silicon process, comprising the steps of:
   forming an electrode layer on a silicon substrate to form an electric circuit during electrolytic polishing;
   forming on the electrode layer a thin-film layer having an electric insulation capability;
   forming in the thin-film layer a cantilever spring element, a contact hole through which to connect the electrode layer and an external lead wire, and a fine hole at an arbitrary position in the spring element to make an electrical connection with the electrode layer;
   forming an erect metal structure, which can be electrolytically polished, at a position of the fine hole of the thin-film layer;
   electrolytically polishing the erect metal structure in an electrolytic polishing liquid to form the erect metal structure into a sharpened metal needle; and
   after the electrolytic polishing process, removing an excess of the silicon substrate and forming the remaining silicon substrate into a mount for the spring element.

2. A method of manufacturing a cantilever according to claim 1; further including the step of forming a protective film over at least one of the entire surface of the metal needle and the entire surface of the spring element including the metal needle in order to protect the metal needle sharpened by the electrolytic polishing.

3. A method of manufacturing a cantilever according to claim 1; wherein the process of forming the erect metal structure, which can be electrolytically polished, comprises a photo-induced chemical vapor deposition process.

4. A method of manufacturing a cantilever using a silicon process, comprising the steps of:
   forming a metal needle forming hole in a silicon substrate;
   forming a thin-film layer having an electric insulation capability on the silicon substrate;
   forming in the thin-film layer a cantilever spring element and a hole smaller than and at the same position as the metal needle forming hole;
   forming in the metal needle forming hole an erect metal structure made of an electrolytically polishable material;
   forming an electrode layer electrically connected to the erect metal structure to form an electric circuit during electrolytic polishing;
   forming on the electrode layer an electric insulation film to protect the electrode layer from corrosion;
   forming in the electric insulation film a contact hole through which to connect the electrode layer with a lead wire; etching the silicon substrate to expose the erect metal structure from under the silicon substrate;
   electrolytically polishing the erect metal structure in an electrolytic polishing liquid to form it into a sharpened metal needle;
   removing excess portions of the electric insulation layer and the electrode layer after the electrolytic polishing process;
   joining a mount for holding the spring element onto the thin-film layer; and
   removing all the remaining silicon substrate.

5. A method of manufacturing a cantilever according to claim 4; further including the step of forming a protective film over at least one of the entire surface of the metal needle and the entire surface of the spring element including the metal needle in order to protect the metal needle sharpened by the electrolytic polishing.

6. A method of manufacturing a cantilever according to claim 4; wherein the process of forming the erect metal structure, which can be electrolytically polished, comprises a photo-induced chemical vapor deposition process.

7. A method of manufacturing a cantilever, comprising the steps of: providing a silicon substrate; forming an electrode layer on the silicon substrate; forming a thin-film layer on the electrode layer; forming in the thin-film layer a spring element and a through-hole, the through-hole being formed at a position adjacent to the spring element; forming an erect metal structure at the position of the through-hole and in electrical contact with the electrode layer; electrolytically polishing the erect metal structure to form a sharpened needle; and removing excess silicon substrate under the spring element to form a cantilevered spring element having the sharpened needle formed integrally therewith.

8. A method of manufacturing a cantilever according to claim 7; wherein the step of forming the spring element and through-hole in the thin-film layer includes forming a contact hole in the thin-film layer; and further comprising connecting a lead wire to the electrode layer through the contact hole for electrical connection with the erect metal structure.

9. A method of manufacturing a cantilever according to claim 7; further comprising, after the step of forming the spring element and through-hole, and before the step of electrolytically polishing, the steps of forming a spacer layer over the thin-film layer; forming a masking layer over the spacer layer; forming a masking hole in the masking layer at a position over the position of the through-hole formed in the thin-film layer; and etching through the masking hole to form a cavity in the spacer layer in communication with the through-hole formed in the thin-film layer; and wherein the step of forming the erect metal structure comprises sputtering a metal though the masking hole and into the cavity to form the erect metal structure.

10. A method of manufacturing a cantilever according to claim 9; further comprising removing the spacer layer and the masking layer after forming the erect metal structure.

11. A method of manufacturing a cantilever according to claim 7; further comprising forming a protective film over at least one of the surface of the sharpened needle and the surface of the spring element.

12. A method of manufacturing a cantilever according to claim 7; further comprising forming a reflection film over the surface of the spring element.

13. A method of manufacturing a cantilever according to claim 7; wherein the step of forming the erect metal structure comprises forming the erect metal structure by photo-induced vapor deposition.

14. A method of manufacturing a cantilever, comprising the steps of: providing a silicon substrate; forming a needle forming hole in the silicon substrate; forming a thin-film layer on the silicon substrate over the needle forming hole; forming in the thin-film layer a spring element and a through-hole, the through-hole being formed at a position adjacent to the spring element and over the needle forming hole; forming an erect metal structure through the through-hole and in the needle forming hole; forming an electrode layer over the thin-film layer and in electrical contact with the erect metal structure; etching the silicon substrate to expose the erect metal substrate; electrolytically polishing the erect metal structure to form a sharpened needle; and removing excess silicon substrate under the spring element to form a cantilevered spring element having the sharpened needle formed integrally therewith.

15. A method of manufacturing a cantilever according to claim 14; further comprising forming an insulating layer over the electrode layer.

16. A method of manufacturing a cantilever according to claim 15; further comprising forming a through-hole in the insulating layer; and attaching a lead wire to the electrode layer through the through-hole in the insulating layer.

17. A method of manufacturing a cantilever according to claim 14; further comprising forming a protective film over at least one of the surface of the sharpened needle and the surface of the spring element.

18. A method of manufacturing a cantilever according to claim 14; further comprising forming a reflection film over the surface of the spring element.

19. A method of manufacturing a cantilever according to claim 14; wherein the step of forming the erect metal structure comprises forming the erect metal structure by photo-induced vapor deposition.

* * * * *